United States Patent
Husson, Jr.

(10) Patent No.: US 8,960,183 B2
(45) Date of Patent: Feb. 24, 2015

(54) SOLAR WATER PASTEURIZER

(75) Inventor: Frank D Husson, Jr., San Diego, CA (US)

(73) Assignee: Solar Solutions LLC, San Diego, CA (US)

(*) Notice: Subject to any disclaimer, the term of this patent is extended or adjusted under 35 U.S.C. 154(b) by 671 days.

(21) Appl. No.: 13/101,965

(22) Filed: May 5, 2011

(65) Prior Publication Data
US 2012/0279927 A1 Nov. 8, 2012

Related U.S. Application Data

(63) Continuation-in-part of application No. 12/842,985, filed on Jul. 23, 2010, now abandoned, which is a (Continued)

(51) Int. Cl.
*B01D 35/30* (2006.01)
*F24J 2/42* (2006.01)
(Continued)

(52) U.S. Cl.
CPC .... *F24J 2/42* (2013.01); *F24J 2/36* (2013.01); *C02F 1/002* (2013.01); *C02F 1/02* (2013.01);
(Continued)

(58) Field of Classification Search
CPC ............ F24J 2/36; B21D 53/02; B01D 35/30; C02F 2209/02; C02F 2303/04; C02F 2201/009; Y02E 10/40; F25D 3/08; F25D 2303/085; F25D 2331/809; A01G 13/0275; A01G 9/16; B29D 7/01; B32B 2250/40; B32B 3/266; B32B 2250/242; B32B 2250/246; B32B 2305/024; B32B 37/146; B32B 3/12; B65D 81/03; B65D 81/022; B65D 81/051; B65D 81/052; B65D 11/20; B65D 81/00; B65D 81/18; B65D 81/24; B65D 81/261; B65D 85/00; B65D 90/022; B65H 2701/1944; A47G 19/2288; B65B 11/00; B65B 55/00; B60H 1/00
See application file for complete search history.

(56) References Cited

U.S. PATENT DOCUMENTS 1,191,572 A * 7/1916 Davis .......................... 206/63.3
1,995,470 A  3/1935 Chaney
(Continued)

FOREIGN PATENT DOCUMENTS

DE  28 51 793   6/1980
DE  200 03 682   5/2000
(Continued)

OTHER PUBLICATIONS

A Summary of Water Pasteurization Techniques; Dale Andreatta; p. 1-7.
(Continued)

*Primary Examiner* — Kang Hu
*Assistant Examiner* — Martha Becton
(74) *Attorney, Agent, or Firm* — Kilpatrick Townsend & Stockton LLP

(57) ABSTRACT

In accordance with the present invention, there are provided solar water pasteurizers that are portable, efficient, inexpensive and easy to use. In its simplest form, the solar pasteurizer includes a transparent container such as a bag or envelope that contains at least one energy converting structure and has sufficient insulation to enable heating water to a temperature of at least 65° C. (and preferably to a temperature of at least 70° C.) for a time sufficient to achieve pasteurization (at 65-70° C., a period of only about 6 minutes is required for pasteurization). Invention solar pasteurizers are particularly useful for pasteurizing water. In additional embodiments, invention solar pasteurizers include additional features, such as, for example, a water pasteurization indicator, and a receptacle for retaining same within the invention container. In accordance with another embodiment of the invention, there are provided methods for pasteurizing water employing solar pasteurizers described herein, as well as kits suitable to convert any transparent water tight container into a solar water pasteurizer.

20 Claims, 9 Drawing Sheets

Related U.S. Application Data continuation-in-part of application No. 10/039,277, filed on Jan. 4, 2002, now abandoned, which is a continuation-in-part of application No. 09/788,336, filed on Feb. 16, 2001, now abandoned.

(60) Provisional application No. 60/299,572, filed on Jun. 19, 2001.

(51) Int. Cl.
   *F24J 2/36*     (2006.01)
   *C02F 1/00*     (2006.01)
   *C02F 1/02*     (2006.01)
   *C02F 1/28*     (2006.01)

(52) U.S. Cl.
   CPC ........... *C02F 1/283* (2013.01); *C02F 2201/009* (2013.01); *C02F 2209/02* (2013.01); *C02F 2303/04* (2013.01); *Y02E 10/40* (2013.01)
   USPC ............... 126/624; 220/592.01; 220/592.25; 229/103.11; 53/170; 383/42

(56) References Cited

U.S. PATENT DOCUMENTS

| | | | |
|---|---|---|---|
| 2,065,506 A | 12/1936 | Billing | |
| 2,208,550 A * | 7/1940 | Shapiro | 604/405 |
| 2,389,185 A * | 11/1945 | Dick | 210/472 |
| 2,648,226 A | 8/1953 | Finch | |
| 2,670,081 A * | 2/1954 | Quinn | 210/316 |
| 2,711,994 A * | 6/1955 | Quinn | 210/205 |
| 2,847,067 A * | 8/1958 | Brewer | 374/160 |
| 2,981,108 A | 4/1961 | Andersen et al. | |
| 3,009,217 A * | 11/1961 | Weiner | 206/212 |
| 3,029,806 A | 4/1962 | Okuda | |
| 3,054,378 A * | 9/1962 | Bienfait | 116/217 |
| 3,323,684 A * | 6/1967 | Furrer et al. | 210/474 |
| 3,335,917 A | 8/1967 | Knight | |
| 3,453,666 A | 7/1969 | Hedges | |
| 3,567,059 A | 3/1971 | Littman | |
| 3,578,544 A * | 5/1971 | Thorsrud | 428/113 |
| 3,701,282 A | 10/1972 | Peterson | |
| 3,939,968 A * | 2/1976 | Ryder | 206/5.1 |
| 4,036,209 A | 7/1977 | Press | |
| 4,059,095 A | 11/1977 | Grundmann et al. | |
| 4,098,019 A | 7/1978 | Strong | |
| 4,143,641 A | 3/1979 | Christopher | |
| 4,151,830 A | 5/1979 | Crombie et al. | |
| 4,160,443 A | 7/1979 | Brindle et al. | |
| 4,187,799 A | 2/1980 | Zwarun | |
| 4,196,721 A | 4/1980 | Posnansky | |
| 4,243,021 A | 1/1981 | Homsy et al. | |
| 4,328,790 A * | 5/1982 | Kircus | 126/624 |
| 4,485,804 A | 12/1984 | Sharpe | |
| 4,520,793 A | 6/1985 | Hall | |
| 4,539,929 A * | 9/1985 | Sestak et al. | 116/221 |
| 4,557,251 A * | 12/1985 | Burkhardt | 126/640 |
| 4,667,352 A * | 5/1987 | Leister | 4/498 |
| 4,790,361 A | 12/1988 | Jones et al. | |
| 4,978,458 A | 12/1990 | Inagaki et al. | |
| 5,005,679 A * | 4/1991 | Hjelle | 190/110 |
| 5,511,536 A * | 4/1996 | Bussey et al. | 126/565 |
| 5,720,714 A * | 2/1998 | Penrose | 602/6 |
| 5,774,908 A | 7/1998 | Hall | |
| 5,820,268 A * | 10/1998 | Becker et al. | 383/99 |
| 5,893,360 A | 4/1999 | Stoumen et al. | |
| 5,932,322 A * | 8/1999 | Jones et al. | 428/198 |
| 6,263,870 B1 | 7/2001 | Stoumen et al. | |
| 6,410,119 B1 * | 6/2002 | De Luca et al. | 428/166 |
| 6,443,309 B1 * | 9/2002 | Becker | 206/594 |
| 6,536,189 B1 * | 3/2003 | Murray | 53/440 |
| 6,897,832 B2 | 5/2005 | Essig et al. | 343/912 |
| 6,913,389 B2 * | 7/2005 | Kannankeril et al. | 383/91 |
| 7,612,735 B2 * | 11/2009 | Essig et al. | 343/915 |
| 7,621,404 B2 * | 11/2009 | Murray | 206/594 |
| D618,092 S * | 6/2010 | Whitaker | D9/431 |
| 7,803,244 B2 * | 9/2010 | Siqueira et al. | 156/229 |
| 7,811,644 B2 * | 10/2010 | DeBraal et al. | 428/34.2 |
| 8,686,323 B2 * | 4/2014 | Su et al. | 219/730 |
| 2006/0033674 A1 | 2/2006 | Essig, Jr. et al. | |
| 2006/0096978 A1 * | 5/2006 | Lafferty et al. | 219/730 |
| 2006/0143767 A1 * | 7/2006 | Yang et al. | 2/16 |
| 2007/0184238 A1 * | 8/2007 | Hockaday et al. | 428/98 |
| 2008/0067169 A1 * | 3/2008 | Lafferty et al. | 219/730 |
| 2008/0098674 A1 * | 5/2008 | Daniels | 52/199 |
| 2008/0135544 A1 * | 6/2008 | Lafferty et al. | 219/730 |
| 2008/0273820 A1 * | 11/2008 | Wiker et al. | 383/103 |
| 2011/0011808 A1 | 1/2011 | Husson, Jr. | |

FOREIGN PATENT DOCUMENTS

| | | |
|---|---|---|
| EP | 0 229 40 | 1/1981 |
| EP | 0 252 484 | 1/1988 |
| EP | 1 106 188 | 6/2001 |
| FR | 2406786 | 5/1979 |
| FR | 2444207 | 7/1980 |
| FR | 2454063 | 11/1980 |
| FR | 2457449 | 12/1980 |
| FR | 2640031 | 6/1990 |
| GB | 1 517 449 | 7/1978 |
| GB | 2 034 876 | 6/1980 |
| GB | 2 035 542 | 6/1980 |
| GB | 2 040 436 | 8/1980 |
| GB | 2 070 231 | 9/1981 |
| JP | 60-069456 | 4/1985 |
| JP | 60-133260 | 7/1985 |
| WO | WO-80/00487 | 3/1980 |
| WO | WO-85/02457 | 6/1985 |
| WO | WO-86/07627 | 12/1986 |
| WO | WO-93/25854 | 12/1993 |
| WO | WO-01/37820 | 5/2001 |
| WO | WO02066905 A2 * | 8/2002 |

OTHER PUBLICATIONS

Advisory Action dated Apr. 26, 2005 for U.S. Appl. No. 10/039,277.
Advisory Action dated Sep. 5, 2003 for U.S. Appl. No. 10/039,277.
Decision on Appeal dated May 24, 2010 for U.S. Appl. No. 10/039,277.
Examination Report dated Jan. 24, 2006 for AU Application No. 2002306398.
Examination Report dated Aug. 11, 2005 for ARIPO Application No. AP/P/2003/002858.
Examiner's Answer dated Aug. 27, 2007 for U.S. Appl. No. 10/039,277.
Intending to Grant dated Apr. 8, 2010 for VN Application No. 1-2003-00685.
International Preliminary Examination Report dated Nov. 25, 2003 for PCT Application No. PCT/US02/00091.
International Search Report dated Nov. 29, 2002 for PCT Application No. PCT/US02/00091.
Interview Summary dated Mar. 31, 2006 for U.S. Appl. No. 10/039,277.
Interview Summary dated May 12, 2005 for U.S. Appl. No. 10/039,277.
Interview Summary dated Jun. 12, 2003 for U.S. Appl. No. 09/788,336.
Interview Summary dated Jun. 18, 2003 for U.S. Appl. No. 10/039,277.
Notice of Allowance dated Jul. 24, 2007 for MX application No. 2003-006888.
Notification of Results of Substantive Examination dated Mar. 24, 2006 for VN Application No. 1-2003-00685 with English translation.
Office Action Nov. 30, 2005 for U.S. Appl. No. 10/039,277.
Office Action dated Apr. 30, 2008 for PH Application No. 1-200-500691.
Office Action dated May 6, 2003 for U.S. Appl. No. 09/788,336.
Office Action dated May 6, 2003 for U.S. Appl No. 10/039,277.
Office Action dated May 14, 2008 for PH Application No. 1-200-500691.
Office Action dated Jul. 10, 2006 for U.S. Appl. No. 10/039,277.

(56) References Cited

OTHER PUBLICATIONS

Office Action dated Jul. 21, 2006 for CN Application No. 02804988.8.
Office Action dated Jul. 29, 2003 for IN Application No. 01190/DELNP/2003.
Office Action dated Aug. 22, 2006 for ID Application No. W00200301814.
Office Action dated Aug. 25, 2004 for PH Application No. 1-200-500691.
Office Action dated Sep. 16, 2004 for U.S. Appl. No. 10/039,277.
Office Action dated Oct. 21, 2003 for U.S. Appl. No. 10/039,277.
Office Action dated Nov. 12, 2002 for U.S. Appl. No. 10/039,277.
Office Action dated Nov. 14, 2002 for U.S. Appl. No. 09/788,336.
Order dated Jan. 9, 2009 for U.S. Appl. No. 10/039,277.
Recent Advances in Solar Water Pasteurization; Dr. Robert Metcalf, p. 1-6.
Record of Oral Hearing dated Jun. 25, 2010 for U.S. Appl. No. 10/039,277.
Safapour et al, Enhancement of Solar Water Pasteurization with Reflectors, Applied and Environmental Microbilogy, 65(2):859-861 (1999).
SODIS News; EAWAG/SANDAC; Martin Weglin; No. 3, Sep. 1998; p. 1-18.
SODIS Technical Note #1-#17; 18 pages.
The Solar Puddle, Dr. Dale Andreatta, Mar. 3, 2000, p. 1-3.
U.S. Patent Office Communication regarding Examiner's Answer dated Jan. 13, 2009 for U.S. Appl. No. 10/039,277.
U.S. Patent Office Communication regarding Examiner's Answer dated Aug. 27, 2007 for U.S. Appl. No. 10/039,277.
U.S. Patent Office Communication regarding Examiner's Answer dated Oct. 15, 2007 for U.S. Appl. No. 10/039,277.
U.S. Patent Office Communication regarding Reply Brief dated Jan. 23, 2008 for U.S. Appl. No. 10/039,277.
Written Opinion dated Jul. 14, 2003 for PCT Application No. PCT/US02/00091.
Non-final Office Aaction dated Dec. 20, 2013 in U.S. Appl. No. 12/842,985.

* cited by examiner

SOLAR WATER PASTEURIZER

RELATED APPLICATIONS

This application is a continuation-in-part of prior application Ser. No. 12/842,985 (filed Jul. 23, 2010) now abandoned, which is, in turn, a continuation-in-part of application Ser. No. 10/039,277 (filed Jan. 4, 2002) now abandoned, which is, in turn, a continuation-in-part of application Ser. No. 09/788,336 (filed Feb. 16, 2001) now abandoned, and claims priority from application No. 60/299,572 (filed Jun. 19, 2001), in which no patenting, abandonment, or termination of proceedings has occurred. The entire disclosure of each of the above-identified applications is considered as being part of the disclosure of the present application and is hereby incorporated by referenced herein.

FIELD OF THE INVENTION

The present invention relates to the field of liquid heating, and more specifically to the use of solar energy to pasteurize water.

BACKGROUND OF THE INVENTION

Existing batch solar water heaters generally comprise a vessel made of glass, metallic or polymeric material that can contain water and may further be constructed of an energy absorbent colored material. Disadvantages of present designs include the fact that many are bulky and made of expensive materials, and still others are inefficient at recruiting, transferring and adequately storing sufficient heat to achieve temperatures adequate to achieve pasteurization. Moreover, many of the current designs are not capable of achieving temperatures required for pasteurizing water.

The majority of diseases in developing countries today are infectious diseases caused by bacteria, viruses, and other microbes which are shed in feces (e.g., human and animal feces) and found in polluted water which people use for drinking or washing. When people drink the live microbes, they can multiply, cause disease (such as diarrhea), and be shed in feces into water, continuing the cycle of disease transmission.

Worldwide, unsafe water is a major problem. An estimated one billion people do not have access to safe water. It is estimated that diarrheal diseases that result from contaminated water kill about 5 million people and cause about 900 million episodes of illness each year. In developing countries city water systems are less reliable, and water from streams, rivers and some wells may be contaminated with pathogens carried by human and animal feces and pose a health threat. For the billion people who do not have safe water to drink the only major recommendation is to boil the water, sometimes for as long as 10 minutes. It has been known since the time of Louis Pasteur (more than 130 years ago) that heat of boiling is very effective at killing all microbes which cause disease in milk and water. However, boiling is not uniformly practiced. Reasons for this include the facts that boiling takes too long, boiled water tastes bad, and fuel is often limited or costly.

There are a number of different disease microbes found in water, but for the most part, they are not unusually heat resistant. For example, the most common causes of acute diarrhea among children in developing countries are the bacteria *Escherichia call* and *Shigelia* and the Rotavirus group of viruses. These are rapidly killed at temperatures of 60° C. or greater. For example, heating water to 65° C. in a solar cooker will provide enough heat to pasteurize the water and kill substantially all disease causing microbes. The fact that water can be made safe to drink by heating to this lower temperature (i.e., 65° C.) instead of 100° C. (boiling) presents a real opportunity for addressing the problem of contaminated water in developing countries. However, solar water pasteurizers are often cumbersome and difficult to operate.

Accordingly, there exists a definite need for a portable solar water pasteurizer that is efficient and that is capable of heating water to a temperature and for a time that results in pasteurization, thereby providing a ready supply of potable water. The present invention satisfies these needs and provides further related advantages.

BRIEF DESCRIPTION OF THE INVENTION

The present invention overcomes many of the problems in the art by providing a simple, inexpensive and portable apparatus for pasteurizing liquids, as well as methods using same. The simple and portable design is useful for providing a renewable supply of drinking water. Moreover, the invention apparatus is relatively inexpensive to manufacture, is trouble-free and reliable in use, and may be readily collapsed and folded for storage or transport.

The invention is embodied in a solar water pasteurizer having a container, at least one energy converting structure for collecting solar energy and imparting it to water within the container, sufficient insulation to minimize heat loss to surfaces that may be in contact with the container (thereby enabling one to achieve water temperatures of at least 65° C.), and one or more temperature indicator(s) that indicates the temperature or temperature history of water within the container (which allows the user to readily determine if the temperature and length of time required for pasteurization have been achieved). In addition, temperature indicators allow the user to monitor the temperature of water in the container and discontinue exposure to irradiation when the water reaches an acceptable temperature. Solar water pasteurizers according to the present invention are thus capable of pasteurizing water by heating the liquid contained therein to temperatures of at least 65° C.

Invention apparatus includes a water tight transparent container for the liquid to be pasteurized, and at least one energy converting structure for collecting solar energy, converting the solar energy into heat, and transmitting the heat to the liquid in the container. The container may have energy converting structure(s) included as an integral part thereof, or the container may be any water tight transparent container, with at least one energy converting structure introduced therein.

In another aspect of the invention, the water pasteurizer may comprise an energy reflective structure to further prevent heat loss to the surrounding environment.

Also provided are methods for pasteurizing liquids. Invention methods comprise introducing liquid into a water tight transparent container having therein the energy converting structure(s), and exposing the container to a suitable energy source, e.g., sunlight, for a time sufficient to heat the liquid to the desired temperature. Pasteurization can be achieved by maintaining the liquid at a specified temperature for a specified time.

Other features and advantages of the present invention will be apparent from the following description of the invention, in conjunction with the accompanying drawings, which illustrate, by way of example, the principles of the invention.

DETAILED DESCRIPTION OF THE INVENTION

Figure 1:
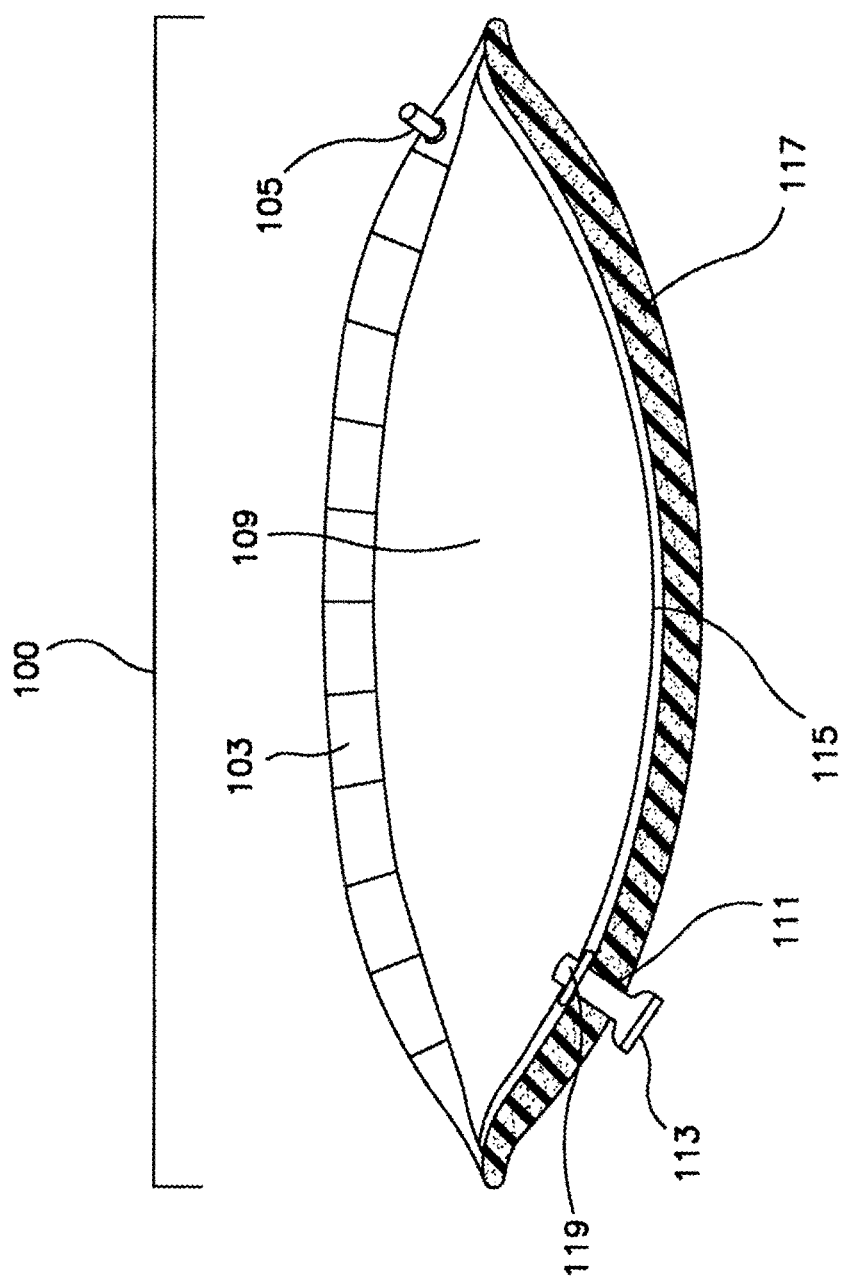
FIG. 1 is a cross-sectional elevation view of one embodiment of an invention solar water pasteurizer.

In accordance with the present invention, there are provided solar water pasteurizers comprising a water tight resealable container, at least one energy converting structure incorporated within said water pasteurizer, one or more insulating structures sufficient to enable said water pasteurizer to achieve water temperatures of at least 65° C., and one or more temperature indicator(s) that indicates the temperature or temperature history of water within the container. In a preferred aspect of this embodiment, at least one of the insulating structures comprises a matrix containing a plurality of substantially air-tight structures having gas contained therein. In a particularly preferred embodiment, insulating structures comprising a matrix containing a plurality of substantially air-tight structures having gas contained therein further comprise one or more vents in the matrix between said plurality of substantially air-tight structures for releasing moisture that would otherwise collect on an inner surface of the insulation structure.

In accordance with another embodiment of the present invention, there are provided solar water pasteurizers comprising a water-tight container, one or more energy converting structures therein, sufficient insulation to produce water temperatures of at least 65° C., and one or more temperature indicator(s) that indicates the temperature or temperature history of water within the container. In a preferred aspect of this embodiment, at least one of the insulating structures comprises a matrix containing a plurality of substantially air-tight structures having gas contained therein. In a particularly preferred embodiment, insulating structures comprising a matrix containing a plurality of substantially air-tight structures having gas contained therein further comprise one or more vents vents in the matrix between said plurality of substantially air-tight structures for releasing moisture that would otherwise collect on an inner surface of the insulation structure.

In accordance with yet another embodiment of the present invention, there are provided solar water pasteurizers comprising a water-tight resealable container, one or more energy converting structures therein, at least one insulating structure associated with said water pasteurizer to reduce energy loss from external surfaces thereof and provide insulation sufficient to enable said water pasteurizer to achieve water temperatures of at least 65° C., and one or more temperature indicator(s) that indicates the temperature or temperature history of water within the container. In a preferred aspect of this embodiment, at least one of the insulating structures comprises a matrix containing a plurality of substantially air-tight structures having gas contained therein. In a particularly preferred embodiment, insulating structures comprising a matrix containing a plurality of substantially air-tight structures having gas contained therein further comprise one or more vents vents in the matrix between said plurality of substantially air-tight structures for releasing moisture that would otherwise collect on an inner surface of the insulation structure.

In accordance with still another embodiment of the present invention, there are provided solar water pasteurizers comprising a water-tight container, wherein said container comprises a top and a bottom and at least one resealable opening, one or more energy converting structures therein, at least one insulating structure to reduce energy loss from external surfaces thereof and provide insulation sufficient to enable said water pasteurizer to achieve water temperatures of at least 65° C., and a temperature indicator that indicates the temperature or temperature history of water within the container. In a preferred aspect of this embodiment, at least one of the insulating structures comprises a matrix containing a plurality of substantially air-tight structures having gas contained therein. In a particularly preferred embodiment, insulating structures comprising a matrix containing a plurality of substantially air-tight structures having gas contained therein further comprise one or more vents vents in the matrix between said plurality of substantially air-tight structures for releasing moisture that would otherwise collect on an inner surface of the insulation structure.

In accordance with the present invention, reuseable temperature indicators contemplated for use herein are preferably maintained in position within the resealable cap by insertion thereof into an out-of-round receptacle therefore (see, for example, FIGS. 8-11).

In accordance with a still further embodiment of the present invention the water pasteurizer may comprise energy reflective surfaces. These surfaces may be associated with said container, and/or associated with said insulating structures. Such reflective surfaces facilitate capture of photons from incident radiation by the pasteurizer, as well as further reducing energy loss and thus enhancing the efficiency of the solar water pasteurizer.

In accordance with yet another embodiment of the present invention the water pasteurizer may further comprise lenses which redirect and/or concentrate incident radiation (e.g., Freznel lenses) so as to enhance the capture of photons from incident radiation by the pasteurizer, thus enhancing the efficiency of the solar water pasteurizer. Such lenses may be associated with the insulating structures or may be provided as a separate element (e.g., as an overlay or additional layer of the invention assembly.

Containers contemplated for use in the practice of the present invention include any portable water tight container. Thus, containers contemplated for use in the practice of the present invention include bags constructed of a flexible material, enclosures of rigid materials (e.g., a bottle, a box, or the like), and the like. The containers may be constructed of glass, polymeric materials (e.g., polyesters such as polyethylene terephthalate; polyolefins such as polyethylene and polypropylene; polyamides, polyethers, and the like, as well as combinations of any two or more thereof), and the like. It is presently preferred that the container be constructed of a material suitable for containing potable water, e.g., polyethylene, polypropylene, polyethylene terephthalate, and the like.

For example, in a particular embodiment of the present invention, a standard transparent polymeric water bottle, or the like, may be employed as the water tight container. Such containers may either comprise an integral energy converting structure or one may be introduced therein. Thus, in one embodiment of the present invention, a standard transparent polymeric water bottle, or the like may be converted into a water heater/pasteurizer by introducing an energy converting structure into the container, and adding an insulating structure and/or a solar or reflective cooker outside of the container.

In accordance with still another embodiment of the present invention, the container comprises one or more pleated structures (e.g., a bellows, or the like) to provide for expansion of the container upon filling said container with liquid. Thus, the container occupies a smaller volume when not filled with liquid, and is commensurately more portable and easy to store.

In accordance with yet another embodiment of the present invention, containers contemplated for use herein can be provided in a variety of shapes to accommodate a variety of spaces where (or uses for which) the container might be stored (or employed). In addition, invention containers can optionally be equipped with one or more straps (or grommets to which one or more straps can be attached) to facilitate carrying the containers, for example strapped on one's back like a backpack, hanging the container from a tree limb or free-standing pole, carrying on one's head, propping up in any convenient configuration to maximize exposure to incident radiation, or the like.

Containers contemplated for use in the practice of the present invention preferably comprise at least one resealable opening for introducing and dispensing liquid. Any resealable opening may be employed, including threaded spout and cap combinations, sports-bottle type caps, snap-top spout and cap combinations, filter-containing caps, zippers (e.g., of the ZIPLOCK™ design, or the like), corks, stoppers, stopcocks, and the like, and/or a shower head or a sprayer type attachment (taking care, of course, that the heated water is allowed to cool to no greater than about 55° C. prior to use as a shower to prevent scalding). It is presently preferred that the resealable opening be water-tight. In one aspect, the opening may comprise an air vent to accommodate expansion of the contents due to heat. In another aspect the water pasteurizer may also include a vacuum type lid that enables water to be pump-sprayed out of the container similar to garden sprayers or a water-well pump design.

As used herein, "polymer" or "polymeric" means any material having a polymer structure (e.g., polyolefins (e.g., polyethylene, polypropylene, and the like), polyesters (e.g., polyethylene terephthalate, and the like), polyamides (e.g., nylon, and the like), polyurethanes, and the like, as well as combinations of any two or more thereof) and which is suitable for containing potable water. Presently preferred materials of construction for the container are polyethylene, polyethylene-nylon coextruded films, and polyethylene terephthalate. In a particular embodiment of the invention, materials contemplated for use in the preparation of invention containers are materials which inherently have an anti-reflective outer surface (or materials to which such a surface can be applied). This will minimize the amount of incident energy which impacts the invention container, but fails to be captured by the water being treated. As readily recognized by those of skill in the art, polymeric materials employed in the practice of the present invention may optionally include stabilizers, UV absorbers, UV inhibitors, and the like. Such additives can enhance the useful life of the invention container and may also increase the efficiency with which invention solar water pasteurizers capture solar energy. Conversely, in areas where incident radiation is plentiful and heating of water within an invention container can be readily accomplished, it may be desirable to use a polymeric material having a higher softening point, or polymeric material modified so as to contain agents which impart a higher softening point to said polymeric material and/or actually reduce light transmission therethrough to reduce the likelihood of overheating the water to be pasteurized (with the potential to compromise the integrity of the vessel). As an alternative to use of polymeric material loaded with one or more additives to reduce light transmission, a thicker sheet of polymeric material can be used, which is also beneficial in providing a more rugged vessel, especially useful when elevated temperatures are reached.

As used herein, "energy converting structure" means a structure having the ability to convert light energy to heat, and which is compatible for use in contact with potable water. Suitable materials include preferably darkly colored polymer sheeting, colored rigid materials such as polymers, metals, or the like. Presently preferred colors are dark green and/or black due to their ability to absorb light and convert the incident radiation into heat. As those of skill in the art can readily understand, by placing an energy converting structure in contact with water, and exposing the structure to sunlight, the energy converting structure will convert the incident radiation to heat, which will be transmitted from the structure into the water.

Any shape and size energy converting structure may be employed in the practice of the present invention. For example, when the envelope-type container described herein is used, a two-sided panel energy converting structure may be employed. As will be understood by those of skill in the art, the greater the surface area of the energy converting structure the more efficient the energy recruitment and heat dispersal will be. Accordingly, it is also contemplated that collapsible energy converting structures (e.g., pleated, accordion-like structures, or the like) may be employed in the practice of the present invention. In this manner, structures of relatively large surface area can be introduced into containers having openings of a limited size. It is further contemplated that the internal energy converting structure may also be joined to the cap or to an external element of the container which is capable of adjusting the position of the energy converting structure inside the container, or for a mixing or stirring effect.

To alleviate heat loss to the surrounding environment, and to increase efficiency of invention pasteurizers, in another embodiment of the present invention, the container may further comprise at least one insulating structure. Insulating structures may be provided at any portion of the container where minimization of heat loss is desired, including the top, bottom and/or sides of the container. The insulating structure may be a separate component that is placed over, around and/or under the container, or the insulating structure may be an integral part of the container, or a combination of integral and separate structures may be employed. For efficient minimization of heat loss to any surface on which the invention water pasteurizer is placed (e.g., the ground), it is presently preferred that invention containers employ an insulating structure that is coextensive with the bottom of the container. It is presently preferred that the insulating structure, if placed on the bottom of the container, also contain an upper surface that comprises an energy reflective structure to redirect potentially escaping energy back into the container. It is presently preferred that the insulating structure, if placed on the top or sides of the container, be transparent to permit the passage of light energy therethrough.

Any of a variety of insulating structures may be employed in the practice of the present invention. In its simplest form, the insulating structure may comprise materials defining an airspace. An insulating airspace may be achieved by any way known to those of skill in the art. For example, in the three ply envelope-type design described herein, an additional ply of flexible material may be bonded to the container to create an inflatable air space (having one or more separate chambers). The inflatable air space optionally comprises a resealable opening, such as those described herein, for the inflation thereof. This configuration has the benefit of requiring minimal space for storage when not in use.

An additional benefit of this configuration is the ability to use such a container in the deflated state to capture heat by conduction even in the absence of incident radiation. Thus, if a warm surface is available on which to rest the invention pasteurizer (even in the absence of incident radiation), deflation of the insulating layer would allow more direct contact with the warm surface and facilitate capture of the energy from the warm surface by the water in the container. In a specific embodiment, the inflatable airspace can be further equipped with a desiccant to minimize clouding (due to the presence of moisture) upon inflation thereof.

Alternatively, rather than being inflatable, the insulating air space can be preformed so that inflation is not required to achieve the desired insulating effect. Thus, materials such as bubble wrap can be used to provide the desired insulating air space.

The airspace can be any of a variety of structures, including those as simple as a mere pillow of air, to more intricate structures such as those provided by insulating materials such as bubble-wrap (i.e., an insulating surface comprising a matrix divided into a plurality of small pockets of air), inflatable multi-chambered structures, closed-cell foam, open cell foam, styrofoam, THINSULATE™, or other such polymeric insulation materials, or the like, all of which are contemplated for use in the practice of the present invention. As readily recognized by those of skill in the art, insulating materials employed in the top surface of the invention pasteurizer should be sufficiently transparent so that radiant energy can pass therethrough.

Not only should the insulating materials employed in the top surface of the invention pasteurizer be transparent, it is desired that such materials maintain their transparency, even after extended use. Thus, for example, where one or more of the materials employed for the preparation of air-containing insulating air space may be permeable over time to the passage therethrough of water vapor, it is desirable to provide one or more openings (vents) in the matrix of the insulating materials, so as to allow escape of any moisture that may otherwise collect (or be trapped) within the pasteurizer structure, thereby preventing (or reducing the degree to which) occlusion of the transparent surface may occur.

Insulating structures contemplated for use in the practice of the present invention can be of almost any shape. Thus, for example, round, oblong, funnel shape, and the like, insulating structures can be employed. In a particular embodiment, the insulating structure is wedge shaped so that it aids in orienting the invention container toward the source of radiation (e.g., the sun). Thus, for example, if an invention container is equipped with grommets with straps attached thereto, the container can be carried on one's back like a backpack, and the insulating structure could be sized to facilitate orienting the container at such an angle that the capture of incident sunlight is maximized, while providing insulation from the heat for the person carrying the bag on their back. As another example, the insulating structure could be configured so as to facilitate carrying the container on one's head. In this configuration, the insulating structure provides both protection to the carrier from exposure to excessive heat from the heated water therein, and stability to the container to facilitate carrying the container.

To further alleviate heat loss to the surrounding environment, and to increase efficiency of invention pasteurizers, in another embodiment of the present invention, the container may further comprise at least one reflective structure capable of redirecting energy towards energy converting structure(s) contained within the water pasteurizer. It is contemplated that any inexpensive material capable of reflecting energy can be used. For example, in accordance with one embodiment of the present invention a reflective structure could be located on the bottom surface of the water pasteurizer either internally or externally. In accordance with another embodiment of the present invention, a reflective structure could be located at the top surface of the water pasteurizer either internally or externally (so as to provide additional collection surface to facilitate capture of incident radiation). In accordance with additional alternate embodiments, the reflective structure may be placed between the container and an insulating structure placed on the bottom surface of the water pasteurizer, or the reflective structure may be placed between the container and an insulating structure placed at the top surface of the water pasteurizer (so as to provide additional collection surface to facilitate capture of incident radiation), and the like.

As used herein, "energy reflecting structure" means a structure having the ability to reflect potentially escaping energy away from the reflecting structure, and/or the ability to capture additional radiation that would otherwise fall outside the invention structure. Suitable materials include colored polymer sheeting, colored rigid materials such as polymers, metals, or the like. A presently preferred color is silver due to its reflective properties. As those of skill in the art can readily understand, by placing at least one energy reflecting structure along an external surface of a container, potentially escaping energy (as well as energy that would otherwise fall outside the invention structure) will be redirected hack towards energy converting structure(s) and/or the liquid to be heated. Thus energy loss will be minimized and thermal efficiency will be enhanced.

In accordance with another embodiment of the present invention, there are provided energy reflecting structures comprising a flared reflective wrap which can be placed about invention containers. Such a structure maximizes the amount of incident energy which is directed toward the container. In an alternative embodiment, the reflective structure can be repositioned from time to time to maximize its ability to redirect the incident energy to the container.

In accordance with yet another embodiment of the invention, additional components may be included to further enhance the efficiency with which incident radiation is collected. For example, one or more battens can be included to constrain the shape of the container upon introduction of water and/or air therein so as to maximize the surface of the water pasteurizer which is properly oriented to efficiently capture incident radiation. As another example, one or more concentrating lenses can be included on at least a portion of the container, or positioned between the container and incident radiation. For example, one or more Freznel lenses can be incorporated as part of the insulating layer placed over the top of the water-containing container (e.g., around the edges of the invention pasteurizer to facilitate capture of additional radiation, or covering substantially all of the top surface of the invention pasteurizer). Alternatively, one or more Freznel lenses can be employed in association with the invention pasteurizer as a separate add-on feature, e.g., as a ring which surrounds the periphery of the pasteurizer, or as an overlay covering some or all of the top surface of the invention pasteurizer.

In a specific embodiment of the present invention, containers contemplated for use in the preparation of invention water pasteurizers comprise an assembly of two pieces (i.e., first and second sheets) of flexible polymeric material stacked on top of one another and bonded together at or near their perimeters (e.g., to create a bag or an envelope).

Two piece envelope-type containers may have an energy converting structure introduced therein, or the energy converting structure may be integrated into the container. For example, in accordance with one embodiment of the present invention, the energy converting structure can be provided as a third piece of flexible polymeric material that is stacked between the first and second sheets and bonded along its perimeter between the first and second sheets. In this manner a three ply envelope is created with one ply comprising an energy converting structure. In the latter embodiment, it is presently preferred that the third sheet (i.e., energy converting structure) have perforations therethrough so that liquid in the container can circulate freely from one side of the energy converting structure to the other. Liquid circulation can also be accomplished in other manners, for example by bonding the energy converting structure on fewer than all sides of its perimeter, thereby also allowing liquid to flow from one side of the energy converting structure to the other. As noted above, such containers can optionally be equipped with straps, or grommets to which straps can be attached to facilitate handling (and orientation) of the container.

Consistent with the foregoing design, in accordance with another embodiment of the present invention, there are provided assemblies comprising stacked first, second and third sheets of a flexible polymeric material, bonded together at or near the perimeters of said sheets to create a three-ply structure, wherein said first and second sheets comprise a watertight container containing therein said third sheet, and wherein said third sheet is a two-sided panel of an energy converting structure. In one aspect of this embodiment, the third sheet may be perforated. In another aspect, the assembly further comprises a fourth sheet of flexible polymeric material stacked onto and bonded to said first or second sheet of material along the perimeter thereof, said fourth sheet providing an insulating airspace. It is presently preferred that each of the chambers defined by the sheets further comprise a resealable opening for the introduction of water and air, respectively, therethrough. The present assembly is further embodied by the optional addition of a plurality of sheets creating multiple tiers, canals, or the like defining airtight spaces comprising insulating structures. The present assembly is still further embodied by the optional addition of a bottom sheet comprising energy reflecting properties.

Invention devices are particularly useful as pasteurization devices. Contrary to popular belief, it is not necessary to boil water to make it safe to drink. Also it is usually not necessary to distill water to make it safe to drink. Heating water to as little as 65-70° C. (149-158° F.) for 6 minutes, or to a higher temperature for a shorter time, will kill substantially all germs, viruses, and parasites. All effective time and temperature combinations are contemplated for use in the practice of the present invention. Furthermore, the temperature demands of the pasteurization protocol may be achieved with or without filtration. Optionally, the water may also be filtered or chemically treated as desired to achieve one's purity preference and/or to achieve a liquid product free from certain undesirable contaminants.

Because the temperature of a liquid must be known to determine the time required for pasteurization, in one embodiment of the present invention, invention water pasteurizers optionally include a temperature indicator (e.g., a thermometer) for indicating the temperature or the temperature history of the liquid within the container portion of invention apparatus and assemblies. Any temperature indicator suitable for determining the temperature and/or temperature history of a liquid in a container may be employed in the practice of the present invention. Easily useable and relatively durable (preferably non-breakable) temperature indicators are presently preferred. Accordingly, in one aspect of the invention, the temperature indicator is a liquid crystal sheet indicator (LCDs), or the like. When LCD indicators are used, they can readily be incorporated in any of a variety of locations within the invention water pasteurizers.

Another means for determining whether water has been heated to a temperature sufficient to achieve pasteurization is to employ a water pasteurization indicator (WAPI) One example of a WAPI is a plastic (or glass) tube with both ends heated, pinched, and sealed, and with a particular type of soybean fat in one end that melts at 154° F. (e.g., the "MYVEROL" 18-06K, available from Eastman Kodak Co., Kingsport, Tenn. 37662). The tube itself is buoyant, but is alternatively fastened in place with suitable fastening means, e.g., a washer, or the like, so it sinks to the bottom (coolest) part of the water, with the fat in the high end of the tube. If the fat is found in the low end of the tube at any later time, that is a clear indication that the water at one time reached the proper temperature for pasteurization, even though the water may have since cooled down. In some embodiments, the fat can be replaced with paraffin formulated so as to melt at a desired temperature.

Alternatively, the WAPI can be positioned within the cap employed to seal the resealable opening, thereby facilitating introduction and removal thereof from the container. A convenient way to position reuseable temperature indicators contemplated for use herein within the resealable cap is by insertion thereof into an out-of-round receptacle therefore (see, for example, FIGS. 8-11).

As yet another alternative, the resealable opening itself could be configured so as to receive one or more WAPI's therein, holding the WAPI in place for ease of introduction and removal (for example by insertion thereof into a plurality of out-of-round receptacles therefore). WAPI's prepared from glass tubes have the advantage of being hermetic, which should provide extended life for the wax therein, while still being relatively durable with respect to the handling to which invention water pasteurizer is likely to be subjected.

Additional WAPIs contemplated for use in the practice of the present invention include multiple WAPIs, wherein two or more tubes are employed, each containing a component that melts at a different temperature, so that a minimum required temperature may be indicated by the first component, and additional temperatures indicated by the additional component(s). Each component employed in this aspect of the invention can be treated to appear a different color, thereby facilitating visual observation thereof. Thus, if the lower melting component has melted, but one or more of the higher melting component(s) has(ve) not, one can more readily establish how long temperature must be maintained to achieve pasteurization. Alternatively, if all of the indicator materials have melted, then one can confirm that the highest indicated temperature has been achieved, and therefore, less time should be required to achieve pasteurization. As readily recognized by those of skill in the art, other WAPIs may also be employed in the practice of the present invention. See, for example, FIG. 11.

Any fastening means (e.g., a nylon string, a bracket within the cap for the container (e.g., an out-of-round receptacle therefore), a slot for receiving the temperature sensing means as part of the energy converting structure, and the like) is suitable for use in the practice of the present invention, so long as there is some means provided to facilitate manipulation and/or retrieval of the tube without recontaminating the water. The tube can be readily reused by flipping it over and attaching the fastening means (e.g., an out-of-round receptacle therefore) to the other end of the WAPI after the wax has solidified.

In accordance with still another embodiment of the present invention, temperature indicating means can be strategically placed at the interface between the fluid-containing portion and the insulating portion, so as to facilitate determination of the temperatures to which the container has been subjected, thus allowing one to monitor and make sure that the contents of the container are not excessively heated, with attendant safety concerns, durability of the container, and the like.

In accordance with another embodiment, invention water pasteurizers may optionally include any one or any combination of various filters including particulate, microbial, and/or odor absorbing charcoal filters. While pasteurization can kill dangerous microorganisms, the process does nothing to improve the taste of water or remove any incipient odors. Use of activated charcoal filters, or the like, will remove unpleasant odors and tastes from water. Accordingly, in another embodiment of the present invention, invention water pasteurizers further comprise an activated charcoal filter, or the like. The filter may be used either inside or outside of the container. In addition, the filter can be associated with the opening of the container so that water can be passed through the filter upon introduction of the water into the container, and/or upon pouring the water out of the container. When charcoal filters are employed, particularly when a container with rigid sides is used, the filter can be mounted to slide into position at the spout of the container when the container is oriented for pouring, and to otherwise rest at a position removed from the spout when the container is in the upright position. In this manner, water can be introduced into the container without passing through the filter. Numerous other means for mounting of a filter are possible and contemplated for use in the practice of the present invention.

Invention solar pasteurizers are not only useful for pasteurizing water, but may also be used as a shower employing pasteurized water. Thus, in accordance with another embodiment of the present invention, the solar pasteurizer may further comprise a shower head in fluid communication with an opening in the container. In this manner, solar heated shower water is provided. A further embodiment of the solar heated shower comprises a temperature indicator which monitors the water temperature to avoid temperatures greater than 55° C., at which temperatures scalding injuries are possible. Various structures to facilitate ease of use, such as hang straps, hooks, and the like, are also contemplated for use in the practice of this and other embodiments of the present invention.

In accordance with a still further embodiment of the present invention, there are provided methods for the pasteurization of liquids, said methods comprising introducing energy converting structure(s) and water into a transparent container, and exposing said container to a suitable energy source for a time sufficient to pasteurize said liquid. Another method for the pasteurization of water embodied by the present invention comprises introducing energy converting structure(s) and water into a container, surrounding said container with insulating material, and exposing said water pasteurizer to a suitable energy source for a time sufficient to pasteurize said water. Solar pasteurizers described herein are all contemplated for use in the practice of this embodiment of the invention. Any methods for the pasteurization of water described herein may further comprise the step of surrounding said container and or entire water pasteurizer with a solar cooker, or another energy focusing device.

As used herein, "a suitable energy source" means any source of energy that is capable of being converted to heat, and which is compatible for use in contact with potable water. The presently preferred energy source is solar energy because of its natural and inexpensive properties. Alternative non-natural light and energy sources are also contemplated for use in conjunction with the present invention. Thus any combination of natural and/or non-natural energy sources are contemplated for use in the practice of the present invention.

In accordance with a further embodiment of the present invention, there are provided methods of assembly of solar water pasteurizers, said methods comprising stacking first, second and third sheets of a flexible polymeric material, bonding same together at or near the perimeters of said sheets to create a three-ply structure, wherein said first and second sheets comprise a water-tight container containing said third sheet, and wherein said third sheet is an energy converting structure. In one aspect of this embodiment, the third sheet may be perforated. In another aspect, the method of assembly further comprises stacking a fourth sheet of flexible polymeric material onto and bonding same to said first or second sheet of material along the perimeter thereof (and optionally at various points across the surface thereof), said fourth sheet providing one or more insulating (inflatable and/or sealed) airspaces. It is presently preferred that each of the chambers defined by the sheets further comprise a resealable opening for the introduction of water and air, respectively, therethrough. The present method of assembly is further embodied by the optional addition of a plurality of sheets creating multiple tiers, canals, or compartments comprising energy converting structures, adjacent to airtight spaces comprising insulating structures.

In accordance with a further embodiment of the present invention, there are provided solar water pasteurizer kits which can be used with existing transparent containers to render them suitable for pasteurization. Invention kits comprise at least one energy converting structure, and at least one thermal insulating structure. The energy converting structure can be introduced into any suitable container, which is then enclosed within the thermal insulating structure to minimize heat loss therefrom. Optionally, invention kits further comprise one or more particulate, anti-microbial, or charcoal filters. Another optional component of invention kits is a temperature indicator for indicating the temperature history of the water contained within said water pasteurizer. Additional optional components of invention kits include a universally fitting cap, spout, stopcock, sprayer, shower, or sport-cap attachment compatible with said existing container outlet. In addition to the thermal insulating structure, invention kits optionally include a reflective cooker, and/or solar cooker, and/or a focusing device to enhance the ability of the resulting water pasteurizer to capture incident energy. Especially preferred reflective structures contemplated for use herein include the flared, reflective wraps described above which can be wrapped around almost any structure, and will not only reflect radiation that might otherwise escape back into the invention container, but it will also increase the amount of incident energy that will actually be collected and directed at the contents of the container.

In accordance with yet another embodiment of the present invention, there are provided solar water pasteurizer kits which can be used with existing containers to render them suitable for pasteurization, said kits comprising at least one energy converting structure, a reflective cooker, and/or a solar cooker.

Several specific embodiments of invention water pasteurizers are now described in greater detail by reference to the Figures. For example, FIG. 1 illustrates a flexible solar water pasteurizer with energy converting structure on the bottom surface thereof. The solar water pasteurizer (100) comprises an insulating air space (103) on the top surface of the pasteurizer, a water chamber (109) centrally located within the pasteurizer, an energy converting structure (115) located on the internal bottom surface of the water chamber (109), and an insulating foam or inflatable structure (117) located on the bottom surface of the container (100). The insulating air space (103) further comprises a plurality of battens (to provide additional support to the insulating airspace and to constrain the top surface of the pasteurizer to a relatively flat orientation so as to maximize the capture of incident radiation) and an air opening (105) used to inflate or deflate the insulating air space (103) as needed. The container (100) also includes a water tight, resealable water fill opening (111) that allows the centrally located water chamber (109) to be emptied and filled as needed. The water fill opening (111) is made resealable through the use of a resealable cap (113) located externally to the container. A water pasteurization indicator (WAPI) (119) is placed into the water chamber (109) through the water fill opening (111), and is used to determine the water temperature history, thus indicating whether temperatures required to achieve pasteurization have been attained.

Figure 2:
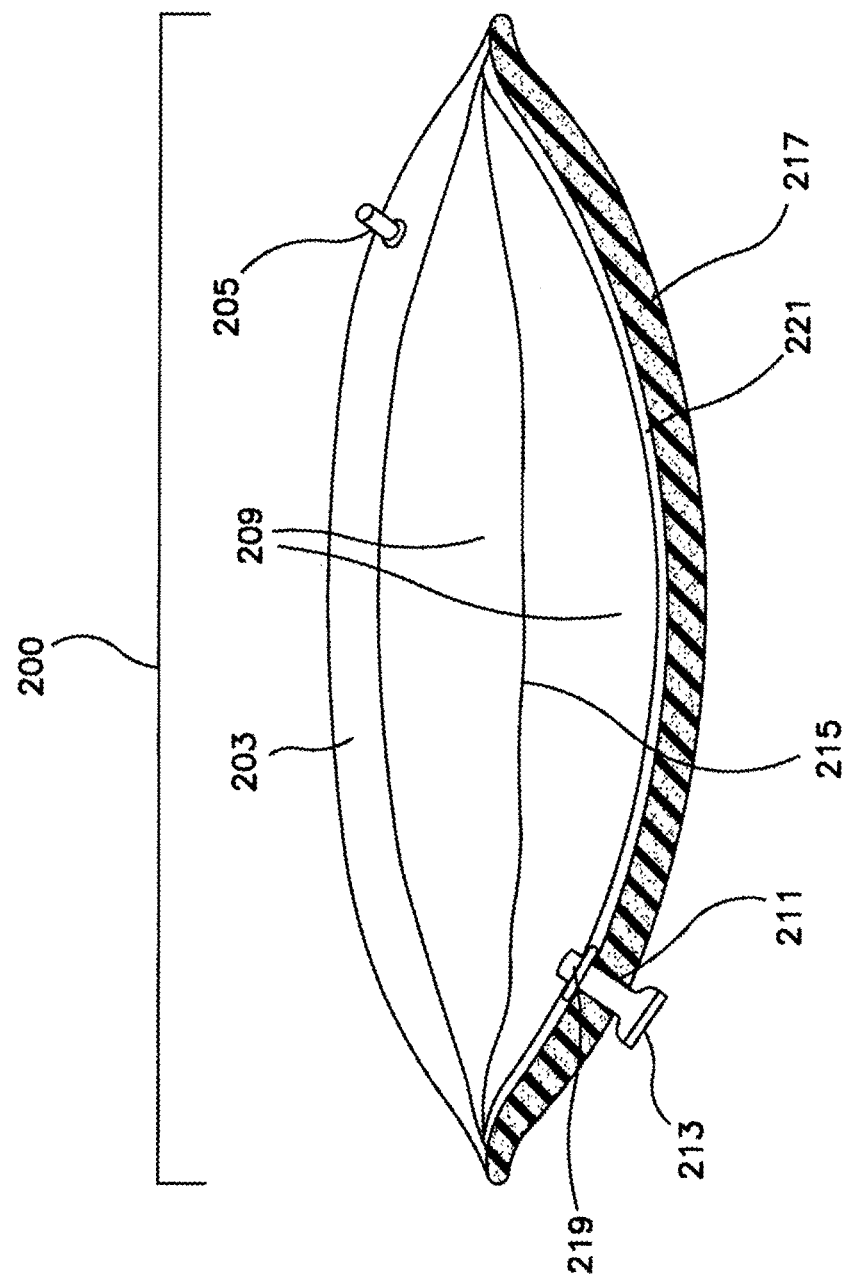
FIG. 2 is a cross-sectional elevation view of another embodiment of an invention solar water pasteurizer.

Another embodiment of invention water pasteurizers is described in FIG. 2. FIG. 2 illustrates a flexible solar water pasteurizer with a perforated energy converting structure placed centrally in the water chamber. The solar water pasteurizer (200) comprises an insulating air space (203) on the top surface of the pasteurizer, a water chamber (209) centrally located within the pasteurizer, a perforated energy converting structure (215) located in the center of the water chamber (209), and an insulating foam structure (217) located on the bottom surface of the container (200). The perforated energy converting structure (215) allows for the free flow of water both above and below structure (215) within the water chamber (209) allowing a mixing effect. The bottom surface of the container (200) further includes a reflective structure (221) located either on the internal or external bottom surface of the container (200) or on the upper surface of the insulating foam structure (217) located on the bottom surface of the container (200). The insulating air space (203) further comprises an air opening (205) used to inflate or deflate the insulating air space (203) as needed. The container (200) also includes a water tight, resealable water fill opening (211) that allows the centrally located water chamber (209) to be emptied and filled as needed. The water fill opening (211) is made resealable through the use of a resealable cap (213) located externally to the container. A water pasteurization indicator (WAPI) (219) is placed into the water chamber (209) through the water fill opening (211), and is used to determine the water temperature history, thus indicating the completion of the pasteurization process.

Figure 3:
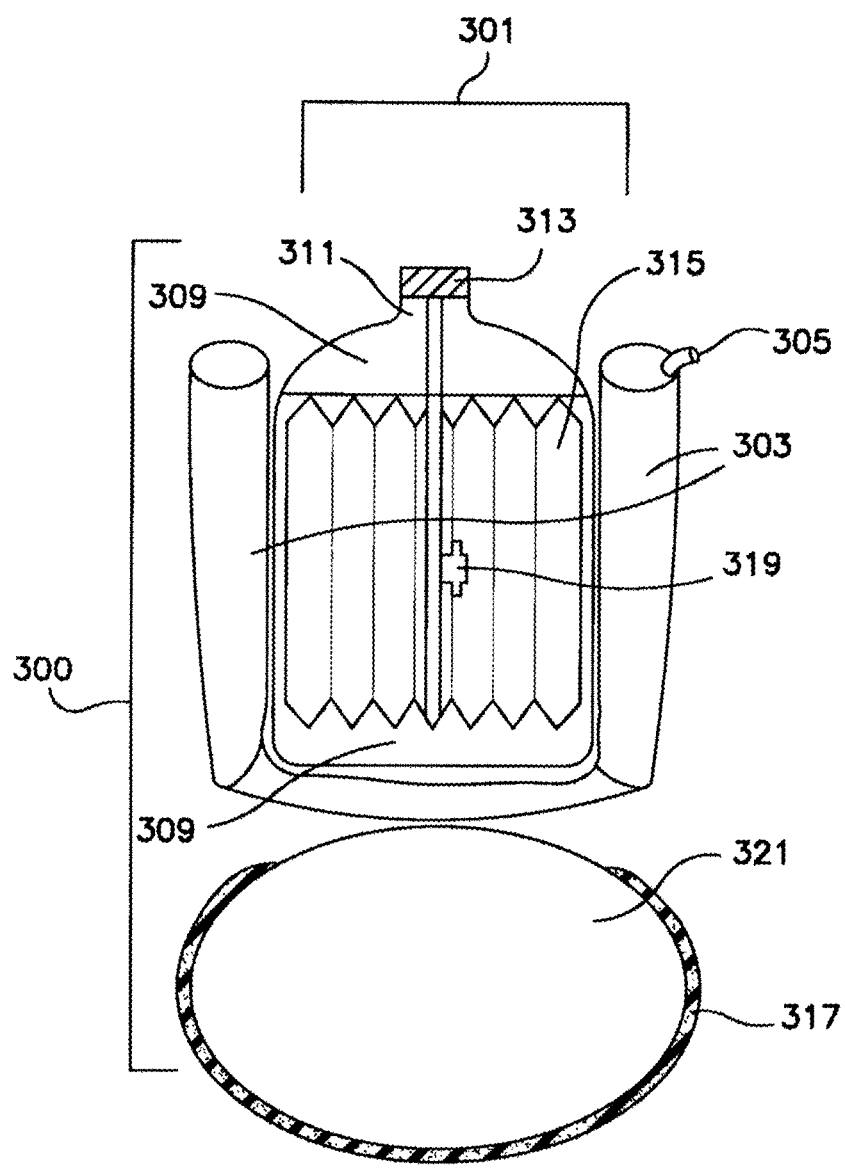
FIG. 3 is a cross-sectional elevation view of yet another embodiment of an invention solar water pasteurizer.

Another embodiment of invention water pasteurizers is described in FIG. 3. FIG. 3 illustrates a rigid solar water pasteurizer. The solar water pasteurizer (300) comprises a transparent resealable container (301), an insulating air space blanket (303) which wraps around the container (301), a water chamber (309) which is the inner compartment of the container (301), an energy converting structure (315) located in the center of the water chamber (309), and optionally an independent insulating foam structure (317) placed below the bottom surface of the container (301). The energy converting structure (315) is expansive (i.e., accordian-like), thus allowing a larger surface area structure to be introduced into the container (301) through a relatively small resealable container opening (311). The energy converting structure (315) allows for the free flow of water both above and below the structure (315) within the water chamber (309) allowing a mixing effect. The bottom surface of the container (301) further includes a reflective structure (321) located on either the internal or external bottom surface of the container (301) (not shown) or on the upper surface of the insulating foam structure (317) placed below the bottom surface of the container (as shown here) (301). The insulating air space blanket (303) optionally further comprises an air opening (305) used to inflate or deflate the insulating air space blanket (303) as needed (e.g., such air opening is not necessary if bubble wrap is used as the insulating layer). The container (301) also includes a water tight, resealable container opening (311) that allows the centrally located water chamber (309) to be emptied and filled as needed. The resealable container opening (311) is made resealable through the use of a resealable cap (313) located externally to the container. A water pasteurization indicator (WAPI) (319) is placed into the water chamber (309) through the resealable container opening (311), and is used to determine the water temperature history, thus indicating the completion of the pasteurization process.

Figure 4:
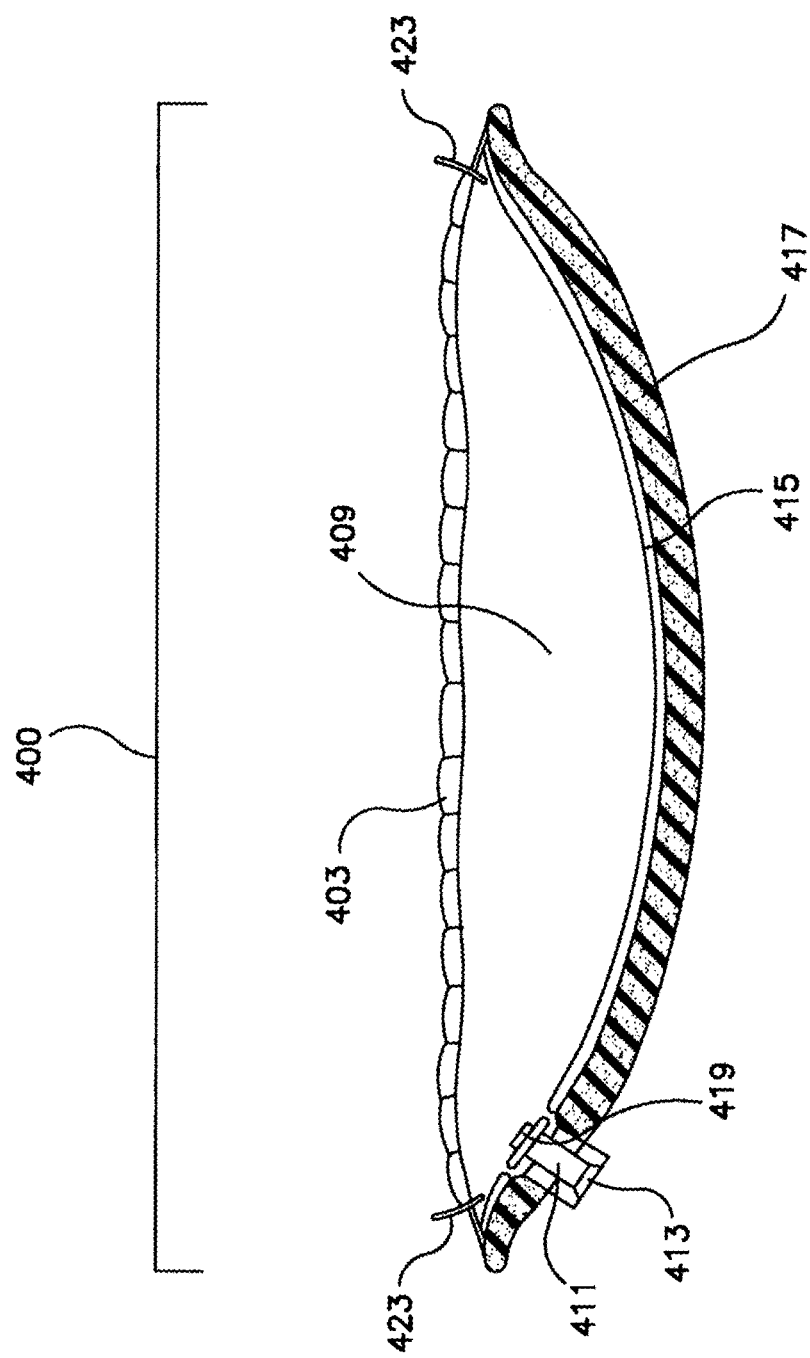
FIG. 4 is a cross-sectional elevation view of a further embodiment of an invention solar water pasteurizer.

Another embodiment of invention water pasteurizers is described in FIG. 4. FIG. 4 illustrates a modified flexible solar water pasteurizer with energy converting structure on the bottom surface thereof. The solar water pasteurizer (400) comprises an insulating air space (403) on the top surface of the pasteurizer, a water chamber (409) centrally located within the pasteurizer, an energy converting structure (415) located on the internal bottom surface of the water chamber (409), an insulating foam structure (417) located on the bottom surface of the container (400) and optional Freznel lenses (423) located at the outer edges of the insulating air space (403). The insulating air space (403) comprises a plurality of air filled chambers, and optionally may comprise an air opening (not shown) used to inflate or deflate the insulating air space (403) as needed. The container (400) also includes a water tight, resealable water fill opening (411) that allows the centrally located water chamber (409) to be emptied and filled as needed. The water fill opening (411) is made resealable through the use of a resealable cap (413) located externally to the container. A water pasteurization indicator (WAPI) (419) is placed into the water chamber (409) through the water fill opening (411), and is used to determine the water temperature history, thus indicating whether temperatures required to achieve pasteurization have been attained.

Figure 5:
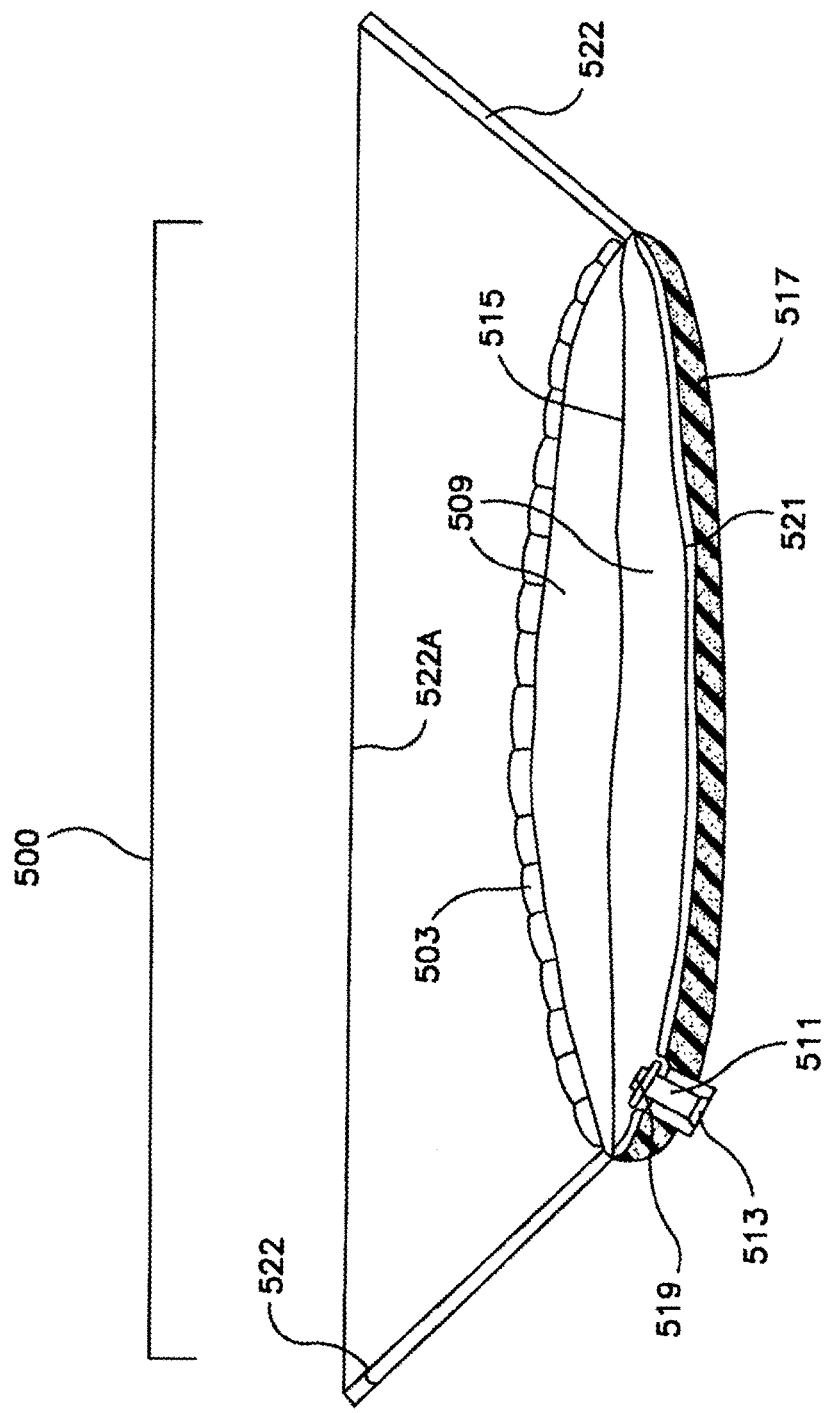
FIG. 5 is a cross-sectional elevation view of still another embodiment of an invention solar water pasteurizer.

Another embodiment of invention water pasteurizers is described in FIG. 5. FIG. 5 illustrates a modified flexible solar water pasteurizer with a perforated energy converting structure placed centrally in the water chamber. The solar water pasteurizer (500) comprises an insulating air space (503) on the top surface of the pasteurizer, a water chamber (509) centrally located within the pasteurizer, a perforated energy converting structure (515) located in the center of the water chamber (509), an insulating foam structure (517) located on the bottom surface of the container (500), and an extended reflective surface (522) or an enclosed transparent top with reflective sides (522A) to facilitate collection of additional incident radiation. The perforated energy converting structure (515) allows for the free flow of water both above and below structure (515) within the water chamber (509) allowing a mixing effect. The bottom surface of the container (500) may further include an optional reflective structure (521) located either on the internal or external bottom surface of the container (500) or on the upper surface of the insulating foam structure (517) located on the bottom surface of the container (500). The insulating air space (503) comprises a plurality of air filled chambers, and optionally may further comprise an air opening (not shown) used to inflate or deflate the insulating air space (503) as needed. The container (500) also includes a water tight, resealable water fill opening (511) that allows the centrally located water chamber (509) to be emptied and filled as needed. The water fill opening (511) is made resealable through the use of a resealable cap (513) located externally to the container. A water pasteurization indicator (WAPI) (519) is placed into the water chamber (509) through the water fill opening (511), and is used to determine the water temperature history, thus indicating the completion of the pasteurization process.

Figure 6:
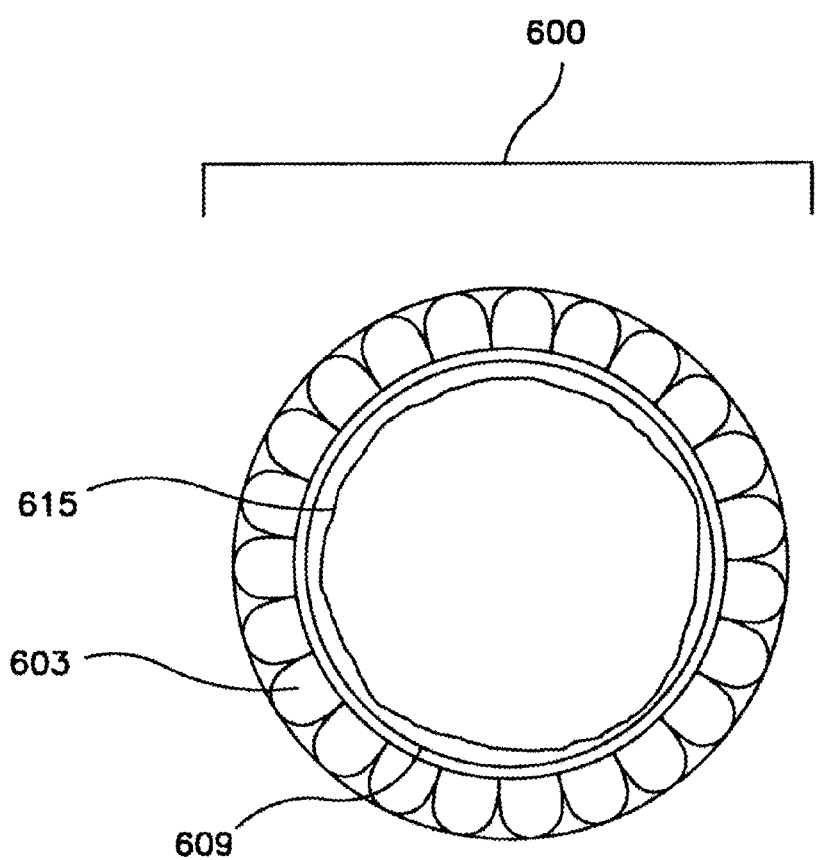
FIG. 6 is a cross-sectional elevation view of yet another embodiment of invention solar water pasteurizer.

Yet another embodiment of invention water pasteurizers is described in FIG. 6. FIG. 6 illustrates a cross-section of a modified rigid solar water pasteurizer. The solar water pasteurizer (600) comprises a transparent resealable water chamber/container (609), a transparent multi-chambered insulating air space blanket (603) which wraps around the water chamber/container (609), an energy converting structure (615) located near the inner walls of the water chamber/container (609). The energy converting structure (615) is introduced through the chamber/container opening (not shown) and expands in a circular manner about the round chamber, and may over-lap or gap depending on the length of energy converting structure (615) used. The insulating air space blanket (603) may further comprise an air opening (not shown) used to inflate or deflate the insulating air space blanket (603) as needed. The water chamber/container (609) also includes a water tight, resealable container opening (not shown) that allows the centrally located water chamber/container (609) to be emptied and filled as needed, and can optionally hold one or more WAPI's therein.

Figure 7:
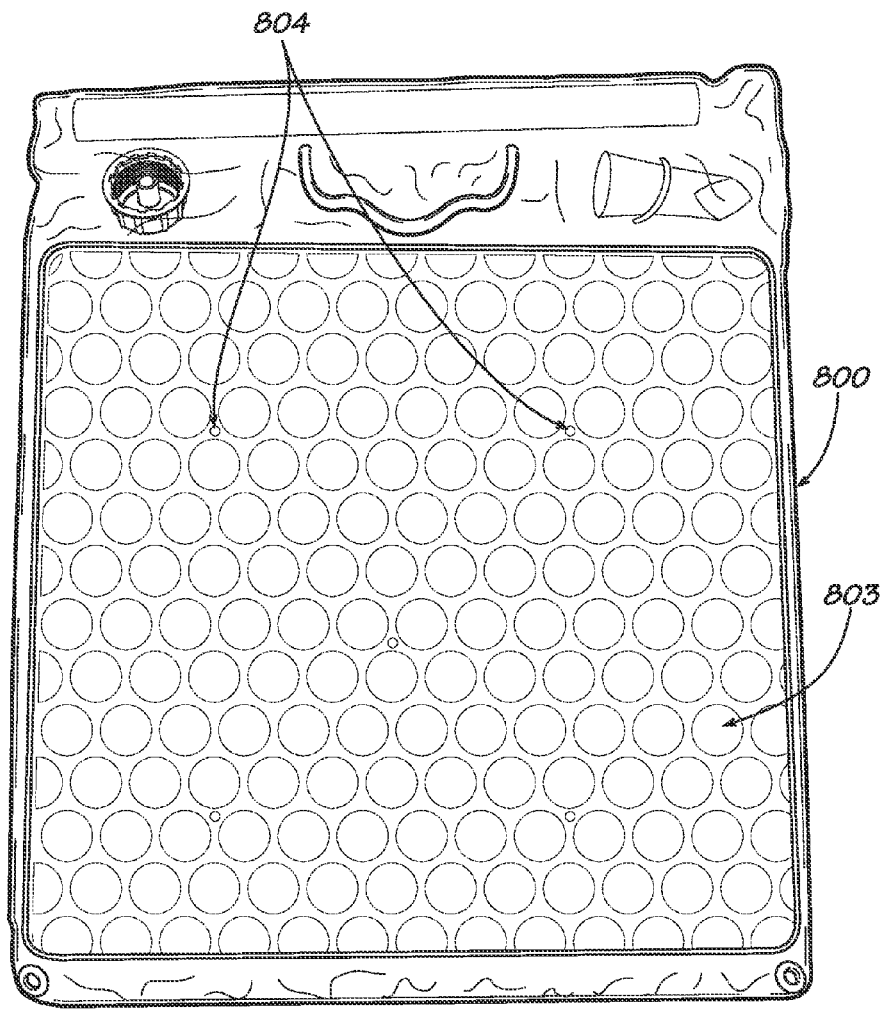
FIG. 7 is a top-view of yet another embodiment of an invention solar water pasteurizer, illustrating the presence of vents in the matrix between the plurality of substantially air-tight structures of the first insulation structure. Such vents allow for the release of moisture that would otherwise collect on the underside of the first insulation structure.

Yet another preferred embodiment of invention water pasteurizers is depicted in FIG. 7. FIG. 7 represents a top-view of an invention solar water pasteurizer (800), illustrating the presence of vents (804) in the matrix between the plurality of substantially air-tight structures of the first insulation structure (803). Such vents allow for the release of moisture that would otherwise collect on the underside of the first insulation structure.

Figure 8:
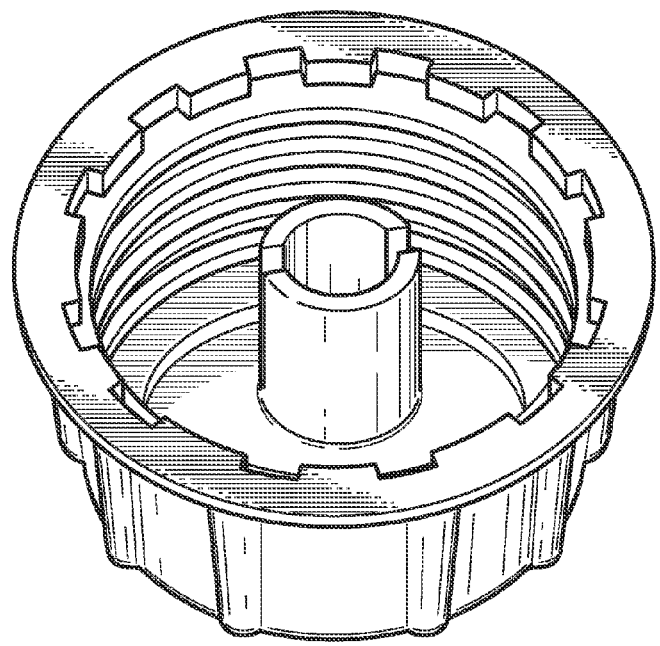
FIG. 8 is photograph view of the underside of a cap according to the invention containing one out-of-round receptacle for insertion therein of a temperature indicator.
Figure 9:
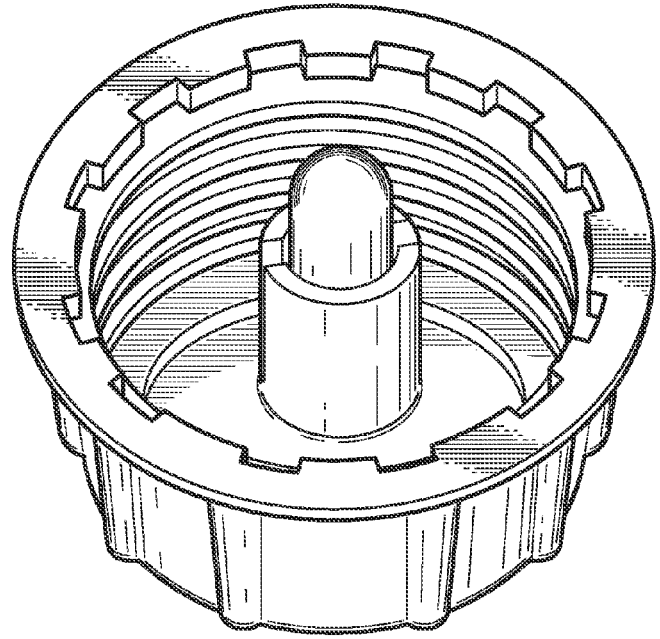
FIG. 9 is a photograph view of the underside of the cap of FIG. 8 having a temperature indicator inserted therein.
Figure 10:
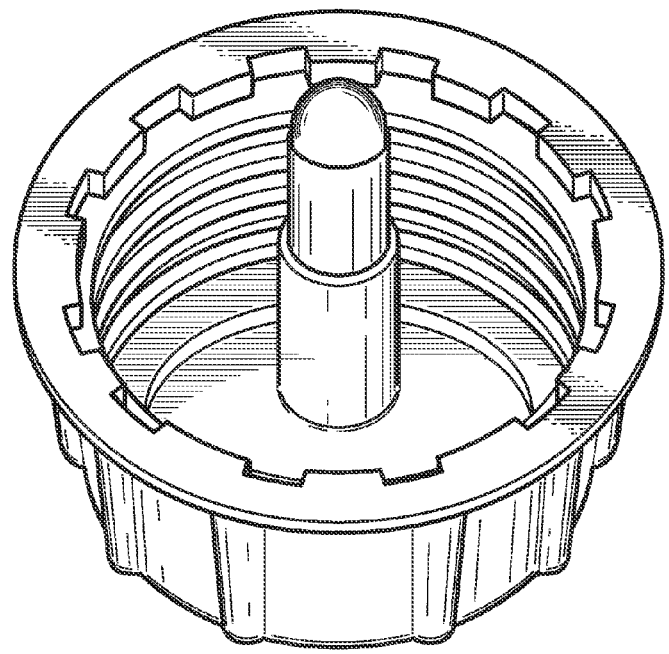
FIG. 10 is a photograph view of the underside of the cap of FIG. 9 after exposure to sufficient heat such that the wax in the temperature indicator has melted and flowed from the top of the temperature indicator to the bottom thereof.

Exemplary out-of-round receptacles for maintaining reuseable temperature indicator(s) contemplated for use herein in position within the resealable cap of invention articles is illustrated in FIGS. 8-11. Thus, for example, FIG. 8 is photograph view of the underside of a cap according to the invention containing one out-of-round receptacle for insertion therein of a temperature indicator, while FIG. 9 is a photograph view of the underside of the cap of FIG. 8 having a temperature indicator inserted therein, and FIG. 10 is a photograph view of the underside of the cap of FIG. 9 after exposure to sufficient heat such that the wax in the temperature indicator has melted and flowed from the top of the temperature indicator to the bottom thereof.

Figure 11:
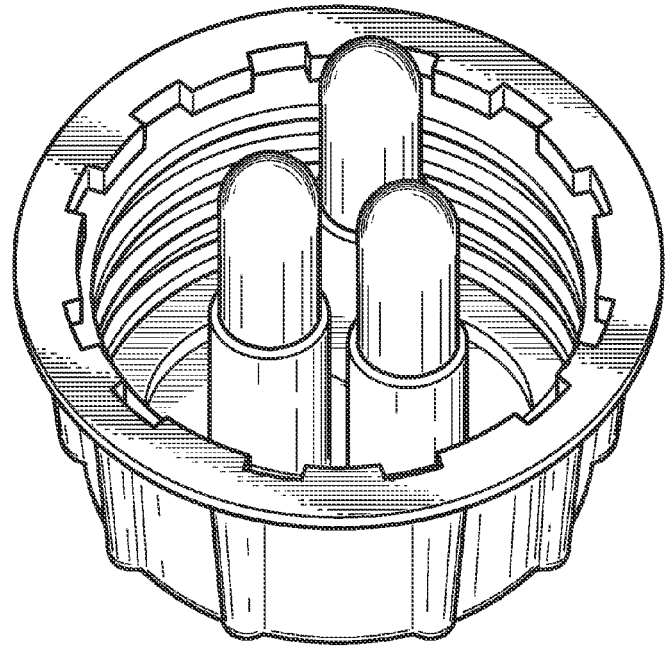
FIG. 11 is a photograph view of the underside of a cap according to the invention containing three out-of-round receptacles for insertion therein of a temperature indicator, each receptacle having a temperature indicator inserted therein.

In accordance with another embodiment of the invention wherein the use of a plurality of temperature indicators is contemplated, FIG. 11 is a photograph view of one such embodiment, wherein the underside of a cap according to the invention contains three out-of-round receptacles for insertion therein of a temperature indicator. In the embodiment illustrated in the figure, each receptacle has a temperature indicator inserted therein.

While the invention has been described in detail with reference to certain preferred is embodiments thereof, it will be understood that modifications and variations are within the spirit and scope of that which is described herein.

That which is claimed is:

1. A solar water pasteurizer comprising:
a flexible water-tight resealable container,
wherein said container comprises a top and a bottom,
wherein said bottom comprises at least one resealable opening,
wherein said resealable opening comprises at least one water-tight spout with a mating resealable cap,
wherein one or more reuseable temperature indicators for indicating the temperature history of the water contained in said container are positioned within said resealable cap,
wherein said one or more reuseable temperature indicator(s) is(are) a glass tube(s) containing wax therein that melts at pasteurization temperatures, and
wherein said glass tube(s) is(are) maintained in position within said resealable cap by insertion thereof within an out-of-round receptacle therefor;
one or more energy converting structures therein, as an integral part of said container,
a first insulation structure on the top of said container,
wherein said first insulation structure comprises a matrix containing a plurality of substantially air-tight structures having gas contained therein, and
wherein said first insulation structure contains one or more vents in the matrix between said plurality of substantially air-tight structures for releasing moisture that would otherwise collect on the underside of said first insulation structure, and
a second insulation structure on the bottom of said container, wherein said second insulation structure is selected from a matrix containing a plurality of substantially airtight structures having gas contained therein, closed cell foam or open cell foam,
wherein said insulation structures collectively are sufficient to enable said pasteurizer to achieve water temperatures of at least 65° C., and
wherein said insulation structures are an integral part of said container.

2. A water pasteurizer according to claim 1, wherein said container comprises a polymeric material.

3. A water pasteurizer according to claim 1, wherein said energy converting structure is black.

4. A water pasteurizer according to claim 1, wherein said energy converting structure is flexible and expansive.

5. A water pasteurizer according to claim 1, wherein said energy converting structure is pleated, or layered to maximize the surface area thereof.

6. A water pasteurizer according to claim 1, wherein said energy converting structure is a two-sided panel, optionally bonded to one or more interior surfaces of said container, and optionally further comprising flow structure that provides for flow of water from a first side of said panel to a second side of said panel.

7. A water pasteurizer according to claim 6, wherein said panel comprises a perforated polymeric material.

8. A water pasteurizer according to claim 1, wherein said insulating structure(s) comprise at least one inflatable airspace inside of said container, at least one inflatable airspace outside of said container, or at least one inflatable airspace inside, and at least one inflatable airspace outside of said container.

9. A water pasteurizer according to claim 1, wherein said insulating structure(s) are coextensive with said container.

10. A water pasteurizer according to claim 1, wherein said insulating structure(s) on both the front and back of said container are inflatable.

11. A water pasteurizer according to claim 1, wherein said first and/or second insulating structure comprises an energy reflective surface.

12. A water pasteurizer according to claim 1, wherein said container comprises one or more hanging attachments to enable gravitational effects to dispel water.

13. A water pasteurizer according to claim 1 wherein said temperature indicator comprises 2 or more reuseable temperature indicators.

14. A water pasteurizer according to claim 1, further comprising one or more particulate, anti-microbial, or charcoal filters.

15. A water pasteurizer according to claim 14, wherein said filter is associated with said resealable opening, such that water introduced into and/or dispensed from said container passes through said filter.

16. A method for the production of potable water, said method comprising exposing water contained within a water pasteurizer according to claim 1 to a suitable energy source for a time sufficient to pasteurize said water.

17. The method according to claim 16, wherein said suitable energy source is sunlight.

18. A method of assembly of a solar water pasteurizer, said method comprising:
stacking first and second sheets of a flexible polymeric material with insulation structure therebetween, wherein said insulation structure is selected from a matrix containing a plurality of air-tight structures having gas contained therein, closed cell foam or open cell foam,
bonding said sheets together with at least one water-tight spout inserted therethrough to create a three-ply structure bonded to the water-tight spout(s), wherein said first and second sheets upon bonding to the water-tight spout(s) form the entrance and exit for water to/from said pasteurizer,
wherein said first sheet has at least one energy reflective layer thereon,
wherein said second sheet is an energy converting structure, and
wherein said water-tight spout(s) further comprise a mating cap, wherein said cap comprises an out-of-round receptacle for receiving one or more re-usable temperature indicators for indicating the temperature history of the water contained therein, intimately associated therewith, and thereafter
stacking and bonding a third and fourth sheet of flexible polymeric material to said first and second sheets of material along the perimeter thereof, oriented so that the third sheet is adjacent to the second sheet,
wherein said third sheet is transparent, and
wherein said fourth sheet provides a transparent insulating airspace,
wherein said transparent insulating airspace comprises a matrix containing a plurality of substantially air-tight structures having gas contained therein, and
wherein said transparent insulating airspace contains one or more vents in the matrix thereof for releasing moisture that would otherwise collect on the side of the fourth sheet adjacent to the third sheet.

19. A method of assembly according to claim 18, wherein said third sheet is perforated.

20. A method of assembly according to claim 18, wherein said fourth sheet comprises a second resealable opening for the inflation of said transparent insulating airspace,
wherein said transparent insulating airspace comprises a matrix containing a plurality of substantially air-tight structures capable of containing gas therein within substantially air-tight structures, and
wherein said transparent insulating airspace contains one or more vents in the matrix thereof for releasing moisture that would otherwise collect on the side of the fourth sheet adjacent to the third sheet.

* * * * *